United States Patent Office 3,595,656
Patented July 27, 1971

3,595,656

REPROGRAPHIC MATERIALS CONTAINING A WATER-INSOLUBLE AZIDOCHALCONE

Hans Ruckert, Wiesbaden-Schierstein, Herbert Maar, Wiesbaden, and Walter Lüders, Neu-Isenburg, Germany, assignors to Kalle Aktiengesellschaft, Wiesbaden-Biebrich, Germany No Drawing. Filed July 3, 1968, Ser. No. 742,141
Claims priority, application Germany, July 7, 1967, P 15 97 614.4
Int. Cl. G03c 1/52, 1/58
U.S. Cl. 96—49 31 Claims

ABSTRACT OF THE DISCLOSURE

This invention relates to a reprographic material for the production of printing forms or other image-bearing products, the material including a layer containing at least one water-insoluble photosensitive azidochalcone compound of the general formula

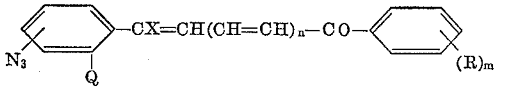

in which Q is hydrogen or a substituent group, each R is a substituent group, X is hydrogen or halogen, $m=1$ or 2 and $n=0$ or 1, the azido group being in the 3- or 4-position of the benzene ring relative to the unsaturated chain, and one substituent group R may be linked with a further substituent group R of the same benzene ring or of the corresponding benzene ring of a second structure of the same kind.

This invention relates to improvements in reprographic materials.

The manufacture is known of materials with reprographic layers from photosensitive aromatic azido compounds and substances that are hardened by the photodecomposition products of the azides, accompanied by a color change in the layer.

Initially, reprographic layers consisting of water-soluble azides and appropriate hydrophilic colloids were proposed, but the quality of these layers was impaired by the sensitivity of the hydrophilic colloids. Furthermore, it is difficult to produce, on most supports, homogeneous layers of high-molecular weight substances from aqueous solution.

It has further been proposed to manufacture reprographic layers from water-insoluble resins and water-insoluble azides capable of application from solutions in organic solvents. For example in U.S. Pat. specification No. 2,940,853, water-insoluble diazidochalcones were proposed as photosensitive components. However, the photosensitivity of these compounds is not entirely satisfactory and in addition they are not sufficiently soluble in the conventional organic solvents.

The present invention provides a reprographic material for the production of printing forms or other image-bearing products, the material including a layer containing at least one water-insoluble photosensitive axidochalcone compound of the general formula

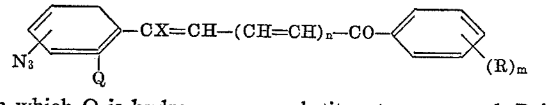

in which Q is hydrogen or a substituent group, each R is a substituent group, X is hydrogen or halogen, $m=1$ or 2 and $n=0$ or 1, the azido group is in the 3- or 4-position of the benzene ring relative to the unsaturated chain, and one substituent group R may be linked with a further substituent group R of the same benzene ring or of the corresponding benzene ring of a second structure of the same kind.

The photosensitive compounds display a higher photosensitivity and better solubility in organic solvents.

The photosensitive compound may be homogeneously distributed in a resin that is insoluble in water, soluble in organic solvents and dissolves or swells in an alkaline aqueous solution.

These compounds are substantially more soluble in the relevant solvents than the known comparable compounds, and the reprographic layers containing them are of a distinctly greater photosensitivity than comparable layers containing the known diazidochalcones.

The substituent Q in the above general formula may be, for example, a halogen atom or a hydroxyl or alkoxy group. Examples of the substituent R are, inter alia, halogen atoms, hydroxyl, alkyl, unsubstituted or substituted alkoxy groups, acylamino, dialkylamino, nitro, sulfazido, sulfonamido and sulfoester groups.

The photosensitive azidochalcones used in the reprographic layers of this invention are new. They are manufactured in a manner analogous to known methods by condensing aromatic azidoaldehydes with methylarylketones under alkaline or acidic conditions. For the alkaline condensation equimolecular proportions of the reactants are dissolved, preferably in an alcohol, generally ethanol, and the solution is mixed at room temperature or at a moderately higher temperature with a small amount of an aqueous or alcoholic alkali metal hydroxide solution. After standing for a few hours, the precipitate formed can be suctioned off and recrystallized from ethanol. Sometimes it is advantageous to perform the condensation under anhydrous conditions and with a sodium alcoholate. For the acid condensation, which is of special advantage with the hydroxychalcones, hydrochloric acid gas is introduced into the combined solution of the reactants—preferably in an alcohol, generally ethanol—at 0° C. to room temperature until the solution is saturated and the product settles out, whereupon it can be recrystallized from a suitable solvent.

The following formulae are exemplary of azidochalcones suitable for use in the reprographic materials of this invention.

Fromula 1

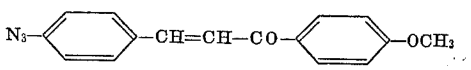

Formula 2

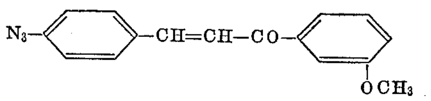

Formula 3

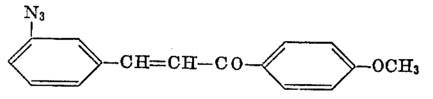

Formula 4

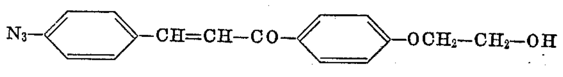

Formula 5

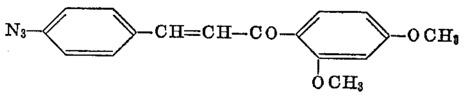

Formula 6

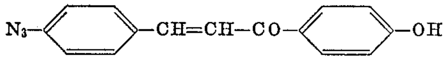

Formula 7

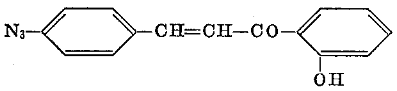

Formula 8

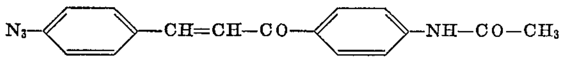

Formula 9

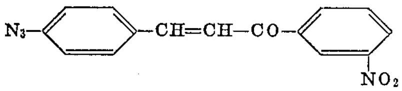

Formula 10

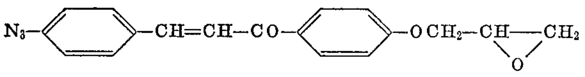

Formula 11

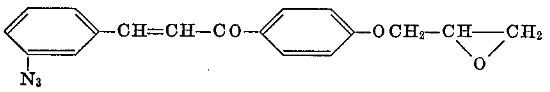

Formula 12

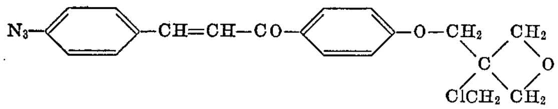

Formula 13

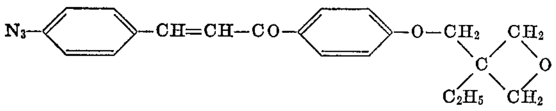

Formula 14

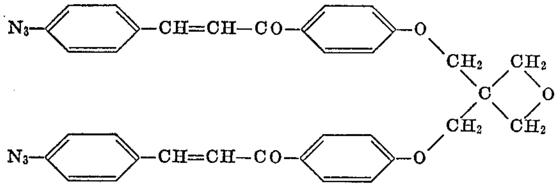

Formula 15

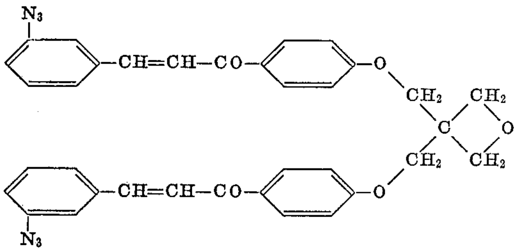

Formula 16

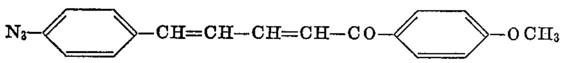

Formula 17

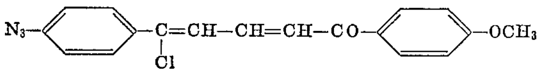

Formula 18

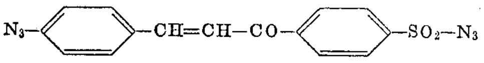

Formula 19

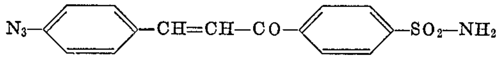

Formula 20

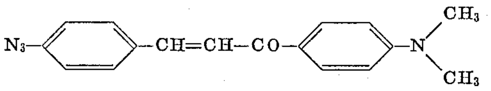

Formula 21

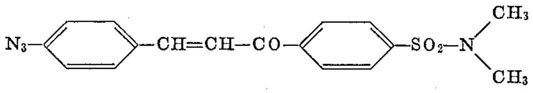

Formula 22

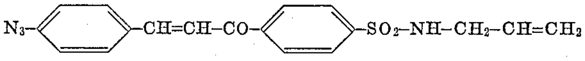

Formula 23

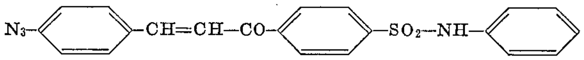

Formula 24

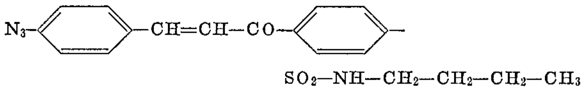

Formula 25

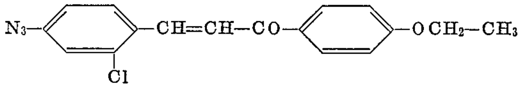

Formula 26

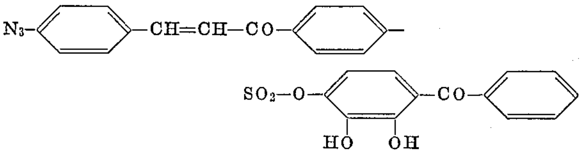

Formula 27

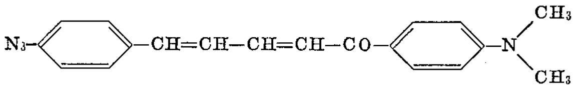

Formula 28

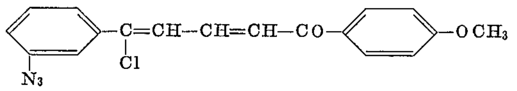

Such of the melting or decomposition points and the absorption maxima of the foregoing compounds as are not set out in the examples below, are listed in the following table:

TABLE

| Formula Number | Melting (or decomp.) point, ° C. | $\lambda_{max.}$, mμ |
|---|---|---|
| 2 | 75–76 | 340 |
| 3 | 91–92 | 314 |
| 5 | 108–109 | 343 |
| 7 | 137–139 | 328 |
| 8 | 174–175 | 348 |
| 11 | 83–84 | 315 |
| 12 | 112–114 | ---------- |
| 13 | 100–102 | 340 |
| 16 | 134–136 | 368 |
| 22 | 141 | 350 |
| 27 | ca. 110 | 394 |
| 28 | 88 | 343 |

The photosensitive reprographic compositions used in the materials of this invention are prepared from one or more azidochalcone compounds of the above general formula, if desired admixed with other negatively working photosensitive substances, preferably with the addition of resins that are soluble in organic solvents and soluble or swellable in an alkaline aqueous medium.

Such resins are, for example, copolymers of styrene with maleic anhydride or of vinyl acetate with crotonic acid, swellable resins manufactured from polycondensates of the novolak type, obtained from formaldehyde and phenols, phenol+formaldehyde resins modified by treatment with chloroacetic acid and cellulose derivatives such as ethylcellulose. Generally, these resins are soluble at 20° C. to an extent of at least 3% by weight in glycol monomethyl ether, glycol monoethyl ether, glycol monomethyl ether acetate or dimethyl formamide and are at 20° C. soluble or swellable in 3% by weight aqueous sodium hydroxide solution at least to an extent such that a dry layer of the resin adhering to a mechanically roughened aluminum surface can be wiped off the aluminum surface with the aqueous sodium hydroxide solution of 3% by weight concentration.

As additional negatively working photosensitive substances there may be used, for example, the azidostilbenes, azido-α-cyano-styryl compounds, azidoazomethines and azidonitrones.

To enhance the film-forming capacity of the reprographic composition of this invention and to improve the stability thereof toward etching solutions, such as may be used in an etching process conventionally performed in chemigraphy, it may be advantageous to use additionally other resins, i.e., those which do not dissolve or swell in an aqueous alkaline solution, grouped together under the designation of lacquer synthetic resins. Particularly useful for this purpose have proved to be polyvinyl acetates, their copolymers and rubber-like resins. In some cases an addition of a plasticizer and a sensitizer also may be advantageous. However, the proportion by weight of the resin that is not soluble or swellable in an alkaline aqueous solution, and of the plasticizer together, should not exceed the proportion of the resin soluble or swellable in an alkaline aqueous solution.

The ratio of the azidochalcone compound of the above general formula on the one hand and of the resins, including plasticizer, on the other hand may vary within wide limits to suit the desired properties of the printing form and the appropriate developer. With some compounds good results are achieved even without any addition of resin, but a preferred ratio by weight of the azidochalcone to the resin is from 2:1 to 1:10, preferably from 1:1 to 1:5. Within these limits the ratio is also dependent on the purpose for which the photosensitive reprographic material is to be used and, for example, on the properties of the developer chosen for the conversion of the reprographic material into a printing form.

To manufacture a photosensitive reprographic material, which consists of a conventional base suitable for use in reprography and a photosensitive reprographic layer adhering to this base, the reprographic composition, which contains resin and photosensitive azidochalcone, is dissolved in an organic solvent and applied to the base; the solution so applied is then dried. Solvents suitable for preparing the coating solution are, for example, esters such as butyl acetate, ketones such as methylisobutyl ketone and cyclohexanone, ethers such as diisopropyl ether and dioxane, alcohols such as n-butanol, hydroxy-ethers such as glycol monoethyl ether, acid amides such as dimethyl formamide and mixtures of such solvents.

The base consists, for example, of a plastic film or paper, possibly pre-treated, or plates or foils of the metals conventionally used for printing forms, such as zinc, magnesium, aluminum, chromium, brass, steel or bimetal and trimetal foils. The base is coated with the reprographic composition in the usual manner, for example by centrifuging, spraying, immersion, application by means of rollers or with the aid of a liquid film.

The reprographic composition may be dyed, or the layer applied to the base may be dried and then dyed. The use of a colored layer is advantageous in many cases, especially to enable a better control of the progress of the development and the tonal values in the case of auto-type processes. When it is necessary to etch the printing forms produced with the reprographic material, dyestuffs are preferred which have little tendency to undergo reductive discoloration in the etching bath, for example dyestuffs of the phthalocyanine type and metal complex dyestuffs.

The conversion of the reprographic material of this invention into a printing form is carried out in the conventional manner. Exposure is performed under a matter with light sources that emit rays that are actinic or lie within the ultraviolet region of the spectrum. Whereas the resins present in the reprographic layer are cross-linked and thus become insoluble in the areas exposed to the printing light, the unexposed areas, which thus remain soluble, are removed by immersion and/or wiping with an organic solvent or preferably with an aqueous alkaline developer. If desired, the developer also may contain salts, for example halides, phosphates, silicates or sulfates of alkali or alkaline earth metals, or quaternary ammonium bases, for example reaction products of amines with ethylene oxide, also organic solvents and mixtures thereof.

In some cases, especially when masking or touching-up is to be carried out on the form, it may be advantageous to bake the layer so as to make it more stable before it is developed or etched. The photosensitive reprographic layers of this invention are distinguished by the fact that baking need not be delayed until after the development following upon the exposure but that it can be carried out after exposure and before development, which may be advantageous. The layer is removed from the unexposed areas, even after baking, by means of more alkaline or more concentrated developer, whereas the areas of the layer on which light has impinged have become more stable towards the developer by the baking operation.

Offset planographic plates produced with the use of the photosensitive reprographic material of this invention are linked up after development with the usual greasy inks. In the case of bimetal and trimetal plates and in flat forms or cylinders for letterpress or rotogravure printing presses the uncoated areas are etched with suitable etching solutions. In the case of zinc or magnesium etching plates this can be achieved on a single-step etching machine with nitric acid with the additon of an edge-protecting agent.

The reprographic layer of this invention is distngushed by its outstanding photosensitivity coupled with a high stability. The reprographic composition of the invention has good storage properties and offers the further advantage that the image can be seen immediately after exposure. Thus, it combines the always demanded, but certainly not always obtained, properties of a photosensitive reprographic material, namely good adhesion between base and photosensitive layer, good photo-sensitivity, good storage properties, immediate visibility of the image to be printed once it has been developed, a high binding power for greasy dyestuffs and great stability of the printing image towards mechanical stresses and its chemical resistance towards any etching solution applied to it.

The following examples further illustrate the invention. In the examples the relationship between parts by weight and parts by volume is the same as between the gram and the milliliter. The proportions of the constituents of liquid mixtures are given in parts by volume or in volume percent solids contents are in percent by weight. The numbered formulae are shown in the above list of formulae.

EXAMPLE 1

1 part by weight of the compound of Formula 6, together with 4 parts by weight of a copolymer of styrene and maleic anhydride and 2 parts by weight of a condensate of metacresol+formaldehyde novolak and monochloroacetic acid were dissolved in 100 parts by volume of glycol monoethyl ether. A mechanically roughened aluminum foil was coated with this solution on a centrifuge and first dried with warm air and then for 2 minutes at 100° C. The resulting photosensitive plate was exposed under a negative master to the light of a carbon arc lamp or an exposure apparatus with tubular lamps (for example for 2 minutes in a "Printaphot" of Foto-Clark, Bonn, Germany) and developed by being wiped over with an aqueous solution of about 2% by weight of sodium metasilicate, whereby a planographic printing plate was obtained. The aluminum foil, inked up with greasy ink and hydrophilized in the developed areas by wiping over with dilute phosphoric acid, was then used for printing.

The compound of Formula 6 is prepared from 4-azidobenzaldehyde and 4-hydroxyacetophenone by acid condensation with HCl in ethanol. The condensate is recrystallized from ethanol; it melts at 160 to 161° C. and has an absorption maximum at 341 mμ.

EXAMPLE 2

3 parts by weight of the compound of Formula 1, 3 parts by weight of metacresol+formaldehyde novolak, 2 parts by weight of polyvinyl acetate resin, 3 parts by weight of a vinyl acetate+crotonic acid copolymer resin and 0.4 part by weight of the phthalocyanine dyestuff Zapon Fast Blue HFL (Color Index 74,350) were dissolved in glycol monoethyl ether. A cleaned zinc plate was coated with this solution, dried, and then exposed under a negative master (about 4 minutes, with a 40 ampere triphase arc lamp, at a distance of 110 cm.). The unexposed areas of the layer were then removed with a solution consisting of 80% of a solution of 3% of sodium metasilicate and 1% of sodium orthophosphate, and 20% of glycol monoethyl ether, and an image was obtained which could be converted into a letterpress printing form by etching with nitric acid, or more advantageously by etching with the addition of an edge-protecting agent in a single-stage etching machine. To improve the adhesion of the layer during the single-stage etching operation and in the manual after-etching to correct the tonal values, the form may be tempered at 100 to 200° C. after the development and before the etching.

The compound of Formula 1 may be prepared by alkaline condensation of 4-azidobenzaldehyde with 4-methoxyacetophenone; it forms pale yellow crystals from ethanol. Melting point 105 to 106° C., absorption maximum 341 mμ.

EXAMPLE 3

5 parts by weight of the compound of Formula 1, 4 parts by weight of a copolymer of styrene with maleic anhydride and 2 parts by weight of a condensate from metacresol+formaldehyde Novolak and monochloroacetic acid (the same resins as in Example 1) and 0.2 part by weight of Crystal Violet were dissolved in a mixture of 50 parts by volume of glycol monomethyl ether and 50 parts by volume of glycol monoethyl ether. A trimetal plate of aluminum+copper+chromium was coated with this solution and dried. To make it into a positive printing form for long runs and dried, coated plate was exposed under a positive master and developed with a solution consisting of 80% of glycol and 20% of diethyleneglycol monoethyl ether. The chromium layer revealed by development in the unexposed areas was dissolved with one of the usual chromium etching agents. The portions of the layer left in the exposed areas of the original layer were removed with an organic solvent and the copper image areas were inked up by wiping over with a greasy ink, whereupon the trimetal plate was ready for printing.

EXAMPLE 4

2 parts by weight of the compound of Formula 18 and 5 parts by weight of a metacresol+formaldehyde novolak were dissolved in 100 parts by volume of glycol monomethyl ether acetate. A mechanically roughened aluminum foil was coated with this solution on a centrifuge and dried, first with warm air and then for 2 minutes at 100° C. The resulting photosensitive foil was exposed under a negative master to ultraviolet-rich light. By wiping the exposed layer with a sodium hydroxide solution of about 1.5% concentration or with an aqueous solution of a quaternary ammonium base formed by reacting an aliphatic amine with ethylene oxide, the unexposed areas of the layer were removed. The aluminum foil was inked up with greasy ink in the usual manner and then used as a planographic printing form.

The compound of Formula 18 is prepared by acid condensation of 4-azidobenzaldehyde with acetophenone-4-sulfonic acid azide (melting point 104 to 105° C.). After recrystallization from ethanol, the product melts at 126 to 127° C. and its maximum absorption is at 355 mμ.

EXAMPLE 5

0.25 part by weight of the compound of Formula 14, 0.75 part by weight of the compound of Formula 10, 1 part by weight of metacresol+formaldehyde novolak and 0.1 part by weight of Michler's ketone were dissolved in 100 parts by volume of a 2:1 mixture of butyl acetate and dimethyl formamide. An anodically roughened aluminum plate was coated with this solution on a centrifuge and then dried with warm air. The plate was then exposed for 4 minutes under a negative master to the light of a 40 ampere triphase arc lamp at a distance of 110 cm. and developed with a 1:5-mixture of glycol monoethyl ether and ethanol. Before being inked up, the developed plate was after-treated with a 7% solution of sodium metasilicate. With this reprographic solution a reprographic layer also can be formed on brushed aluminum; in this case the unexposed layer is developed with n-propanol and need not be after-treated with metasilicate.

The compound of Formula 14 is prepared by alkaline condensation of equimolecular proportions of 4-azidobenzaldehyde and the appropriate bis-acetophenone compound in dioxane. The acetophenone compound is obtained by condensing 3,3-bis-chloromethyl-oxetane with 4-acetyl-potassium phenolate. The condensate of Formula 14 melts with decomposition at 171 to 177° C. and displays an absorption maximum at 340 mμ.

The compound of Formula 10 is prepared by alkaline condensation of 4-azidobenzaldehyde with 4-glycidoxy-acetophenone. Melting point: 109 to 110° C. Absorption maximum: 340 mμ.

EXAMPLE 6

0.3 part by weight of the compound of Formula 10, 0.3 part by weight of the compound of Formula 15, 0.3 part by weight of the compound of Formula 14, 1 part by weight of a metacresol+formaldehyde novolak and 0.1 part by weight of Michler's ketone were dissolved in 100 parts by volume of a 2:1 mixture of butyl acetate and dimethyl formamide. This reprographic solution is suitable for making a planographic printing plate from anodically roughened or brushed aluminum as described in Example 5.

The compound of Formula 15 is prepared from 3-azido-benzaldehyde as described for the manufacture of the compound of Formula 14. It melts at 156 to 158° C.

EXAMPLE 7

0.5 part by weight of the compound of Formula 10, 0.5 part by weight of the compound of Formula 14, 0.5 part by weight of the compound of Formula 15 and 0.1 part by weight of Michler's ketone were dissolved, without the addition of resin, in 100 parts by volume of a 1:1 mixture of butyl acetate and dimethyl formamide. An anodically roughened aluminum foil was coated with this solution on a centrifuge. The dried, coated photosensitive reprographic material was made ready for printing in known manner by exposure, developing with a developer consisting of a 5:2-mixture of isopropanol and glycol monomethyl ether, after-treating with a sodium metasilicate solution of about 7% concentration and inking up by wiping over with a greasy ink.

EXAMPLE 8

2 parts by weight of the compound of Formula 20, 4 parts by weight of a copolymer of styrene with maleic anhydride and 2 parts by weight of a condensate of meta-cresol+formaldehyde novolak and monochloroacetic acid were dissolved in 100 parts by volume of a mixture of 70% of glycol monoethyl ether, 15% of glycol mono-butyl ether and 15% of butyl acetate. Trimetal plates were coated with this solution by spraying with a spray gun in a dust-free room, the plates being laminates of back plate, copper and chromium. The dried layer was exposed under a positive master and developed by pouring over and wiping with a developer solution consisting of 90% of glycol and 10% of diethylene glycol monoethyl ether, or with an aqueous alkaline solution having a pH value of about 12. After development the plate was immediately rinsed with water and the revealed chromium was removed by etching down to the copper layer with an acid chromium etching solution. The unexposed layer was then removed with an organic solvent, for example acetone, and the copper image was made ready for printing by wiping it over with greasy ink.

The compound of Formula 20 is prepared by alkaline condensation of 4-azidobenzaldehyde with 4-dimethyl-aminoacetophenone (melting at 102 to 104° C.) which itself is readily prepared from 4-aminoacetophenone by reductive methylation with formaldehyde. The product recrystallized from ethanol melts at 162° C. and displays absorption maxima at 326 and 386 mμ.

EXAMPLE 9

2 parts by weight of the compound of Formula 10, 1 part by weight of the compound of Formula 19, 4 parts by weight of a metacresol+formaldehyde novolak, 1.5 parts by weight of a vinyl acetate+crotonic acid copolymer resin and 0.2 part by weight of Methyl Violet were dissolved in 100 parts by volume of a 1:1-mixture of glycol monomethyl ether and glycol methyl ether acetate. Copper plates were coated with this solution by centrifuging and by spraying, respectively. The dried layer was exposed under a positive screen master and developed with an alkaline developer by immersion and wiping over. The developer consisted of 2 parts of an aqueous solution of 3% by weight sodium metasilicate and 2% by weight of sodium orthophosphate and 1 part of a 2:1-mixture of triethanolamine and 4-hydroxymethyl-dioxolane-1,3 (prepared from glycerol and formaldehyde). After developing and rinsing with water the revealed areas of the copper plate were etched in the usual manner with ferric chloride solution and then the layer was removed in the non-image areas with a solvent or a strong alkali solution. This procedure furnished a photogravure printing form which may be chromium plated if it is to be used for long runs.

The compound of Formula 19 is obtained by alkaline condensation of 4-azidobenzaldehyde with acetophenone-4-sulfonic acid amide (melting point 178 to 180° C.). The latter compound is prepared from the known acetophenone-4-sulfochloride by introducing ammonia into an ethanolic solution thereof. The condensation product of Formula 19 was recrystallized from aqueous dioxane; it melts and decomposes at 180 to 182° C. and its absorption maximum is at 368 mμ.

EXAMPLE 10

3 parts by weight of the compound of Formula 5, 3 parts by weight of metacresol+formaldehyde novolak, 1 part by weight of a condensate of this novolak with monochloroacetic acid, 3 parts by weight of a vinyl acetate+crotonic acid copolymer resin and 0.5 part by weight of the phthalocyanine dyestuff Zapon Fast Violet BE (Color Index 12,196) were dissolved in 100 parts by volume of glycol monoethyl ether. A zinc letterpress plate was produced with this reprographic solution as described in Example 2. As a developer for this plate a 3:1 mixture of the solution mentioned in Example 9 can be used. Alternatively, the plate can, after exposure and before development, be baked for 10 minutes at 180° C. and then developed with 5% sodium hydroxide solution containing 25% of glycol monoethyl ether.

The compound of Formula 5 is prepared by alkaline condensation of 4-azidobenzaldehyde with 2,4-dimethoxy-acetophenone and recrystallization from ethanol. Melting point: 108 to 109° C. Absorption maximum: 343 mμ

EXAMPLE 11

1 part by weight of the compound of Formula 2, 1 part by weight of the compound of Formula 9, 5 parts by weight of a metacresol+formaldehyde novolak and 3 parts by weight of the condensate of this novolak with monochloroacetic acid were dissolved in 100 parts by volume of glycol monomethyl ether. A paper printing foil was coated with this solution, dried, exposed under a negative master and developed. The developer used was a mixture of 4 parts of a 3% sodium metasilicate solution and 1 part of a 90:10 mixture of glycol and diethylene glycol monoethyl ether. After this, the foil need only be rinsed and inked up with greasy ink to make it ready for printing.

When the base used is a polyester film stencil, a printing plate for a small-scale offset press can be produced in the same manner, using the same developer and within substantially the same processing time.

The compounds of Formulae 2 and 9 are obtained by alkaline condensation of 4-azidobenzaldehyde with 3-methoxyacetophenone and 3-nitroacetophenone respectively, followed by recrystallization from methanol and dioxane respectively. The compound of Formula 9 melts at 155 to 156° C. and displays an absorption maximum at 348 mμ.

EXAMPLE 12

1 part by weight of the compound of Formula 20, 1 part by weight of the compound of Formula 21, 2 parts by weight of a copolymer of styrene and maleic anhydride, 1 part by weight of a condensate of meta-cresol+formaldehyde novolak with monochloroacetic acid, 1 part by weight of a vinyl acetate+crotonic acid copolymer resin and 0.3 part by weight of the dyestuff Zapon Fast Violet BE were dissolved in 100 parts by volume of a 2:1 mixture of glycol monoethyl ether and dimethyl formamide. This solution was used for coating a base consisting of an electrically well insulated, copper-faced plastic plate or film, and the solution applied to the copper facing was then dried. The dry layer was exposed under a negative wiring diagram and the areas of the layer that had remained unexposed were removed from the base by being wiped over with a sodium orthophosphate solution of about 15% concentration. The revealed areas of the copper, which had itself been thoroughly cleaned before the coating operation, were etched away with a solution of ferric chloride or ammonium persulfate and a so-called printed circuit was obtained which, after the layer has been removed by a solvent, can be improved, for example by electrolytic silvering.

The compound of Formula 21 is prepared by acid condensation of 4-azidobenzaldehyde with acetophenone-4-sulfonic acid diethylamide (melting at 80 to 82° C.; prepared from acetophenone-4-sulfochloride). The product of Formula 21 melts and decomposes at 160 to 161° C. Absorption maximum: 348 mμ.

EXAMPLE 13

2 parts by weight of the compound of Formula 25, 4 parts by weight of a metacresol+formaldehyde novolak, 1 part by weight of a vinyl acetate+crotonic acid copolymer resin and 0.5 part by weight of the dyestuff Patent Blue V were dissolved in 100 parts by volume of a 1:1 mixture of trichloroethylene and isopropanol. A cleaned copper+chromium bimetal foil was coated with this solution on the chromium side, dried and cut to size.

This pre-coated photosensitive material was then exposed under a negative script master, developed by being wiped over with a sodium hydroxide solution of about 4% concentration, and the revealed image areas were etched down to the copper with a chromium etching agent. If desired, the resulting sign plates may be freed from the reprographic layer in the non-image areas and inked up imagewise with any desired greasy ink and/or coated with a protective varnish.

The compound of Formula 25 is prepared by alkaline condensation of 4-ethoxyacetophenone with 2-chloro-4-azidobenzaldehyde (melting at 53 to 54° C.), which latter is prepared, by diazotization and subsequent reaction with sodium azide, from 2-chloro-4-aminobenzaldehyde obtained from 2-chloro-4-nitrotoluene. The compound is recrystallized from ethanol and melts at 114° C.; its absorption maximum is at 341 mμ.

EXAMPLE 14

1 part by weight of the compound of Formula 17, 6 parts by weight of a metacresol+formaldehyde novolak and 0.5 part by weight of Methyl Violet were dissolved in 100 parts by volume of glycol monomethyl ether. An electrolytically roughened aluminum foil was coated with this reprographic solution and then dried. This foil was used to make a lithographic printing plate for medium runs by being exposed under a negative master, developed with a 5% sodium metasilicate solution consisting of 30% by volume of methanol, 20% by volume of glycol and 15% by volume of glycerol, then rinsed and inked up with printing ink in the usual manner.

The compoud of Formula 17 is prepared by alkaline condensation of 4-azido-β-chlorocinnamylaldehyde (decomposition point 104 to 106° C.), obtained from 4-azidoacetophenone, with 4-methoxyacetophenone in ethanol. After recrystallization from ethanol it melts at 126 to 128° C. and has an absorption maximum at 364 mμ.

EXAMPLE 15

1 part by weight of the compound of Formula 22, 1 part by weight of the compound of Formula 24, 2 parts by weight of a mixture of Formula 26, 2 parts by weight of a vinyl acetate-crotonic acid copolymer resin, 1 part by weight of a polyvinyl ethyl ether, 4 parts by weight of a metacresol+formaldehyde novolak and 0.5 part by weight of Zapon Fast Violet BE were dissolved in 100 parts by volume of ethylene glycol monomethyl ether. A zinc plate which had been degreased and roughened by being slightly etched was coated with this solution, dried and exposed under a negative master. After development by immersion and wiping over with a developer consisting of a sodium hydroxide solution of 1% concentration containing 5% of ethylene glycol monoethyl ether, the plate was etched in the image-free areas in the usual manner in a single-stage etching machine to furnish a printing block. To improve the adhesion of the layer during etching and to facilitate tonal value correction by after-etching, the developed plate may be tempered at 100 to 200° C. before being etched.

The compounds of Formulae 22, 24 and 26 are obtained by acid condensation of 4-azidobenzaldehyde with the following compounds respectivedly, prepared in a manner similar to the aforementioned acetophenone derivatives: Acetophenone-4-sulfonic acid allylamide (M.P. 114–115° C.), acetophenone-4-sulfonic acid-n-butylamide (M.P. 90–91° C.) and acetophenone-4-sulfonic acid-2,3 4-trihydroxybenzophenone ester. The esterification yields a mixture of the mono- and bis-ester with a preponderance of bis-ester (decomposition point 160–163° C.) and the condensation yields a mixture of mono- and bis-chalcone (decomposition point 140 to 146° C.) which, even in the absence of resins, does not tend to crystallize on the printing plate. Formula 26 is merely a representative formula for the resulting mixture of compounds. The compound of Formula 24 melts at 132 to 133° C. and has an absorption maximum at 350 mμ.

It will be obvious to those skilled in the art that many modifications may be made within the scope of the present invention without departing from the spirit thereof, and the invention includes all such modifications.

What is claimed is:

1. A reprographic material including a layer containing at least one water-insoluble photosensitive azidochalcone compound of the general formula

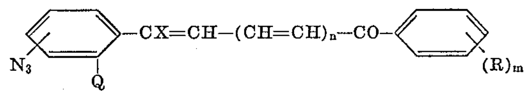

in which Q is selected from the group consisting of hydrogen, halogen, hydroxy, or alkoxy, each R is a substituent group, X is selected from the group consisting of hydrogen and halogen, $m=1$ or 2, $n=0$ or 1, the azido group being in the 3- or 4-position of the benzene ring relative to the unsaturated chain, and one substituent group R may be linked with another substituent group R of the same benzene ring or of the corresponding benzene ring of a second structure of the same kind.

2. A reprographic material according to claim 1 in which, in the layer the compound is homogeneously distributed in a resin that is insoluble in water, soluble in organic solvents, dissolves or swells in an alkaline aqueous solution, and is soluble at 20° C. to an extent of at least 3 percent by weight in glycol monomethyl ether, glycol monoethyl ether, glycol monoethyl ether acetate, or dimethylformamide, and being attacked by 3 percent by weight aqueous sodium hydroxide solution at 20° C. so that a dry layer of the resin adhering to a mechanically roughened aluminum surface can be removed with the solution.

3. A reprographic material according to claim 2 in which the layer includes at least one additional resin which does not dissolve or swell in an aqueous alkaline solution and is polyvinyl acetate, a copolymer thereof, or a rubber-like resin, the additional resin being present in a proportion by weight which does not exceed the proportion of the soluble or swellable resin.

4. A reprographic material according to claim 3 in which the layer includes a plasticizer, the additional resin and plasticizer being present in a total proportion by weight which does not exceed the proportion of the soluble or swellable resin.

5. A reprographic material according to claim 3 in which the proportion of the compound to total resin is in the range of about 1:1 to 1:5 by weight.

6. A reprographic material according to claim 4 in which the proportion of the compound to total resin plus plasticizer is in the range of about 1:1 to 1:5 by weight.

7. A reprographic material according to claim 1 in which the compound is admixed with at least one other negatively working photosensitive substance.

8. A reprographic material according to claim 1 in which the layer contains a dyestuff having little tendency to discoloration by etching liquids.

9. A reprographic material according to claim 1 in which the compound has the formula

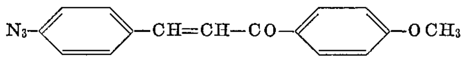

10. A reprographic material according to claim 1 in which the compound has the formula

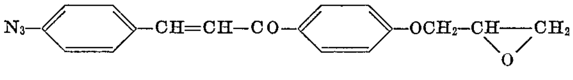

11. A reprographic material according to claim 1 in which the compound has the formula

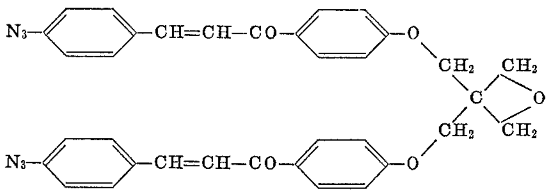

12. A reprographic material according to claim 1 in which the compound has the formula

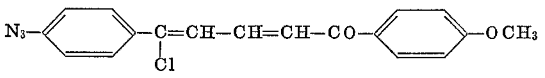

13. A reprographic material according to claim 1 in which the compound has the formula

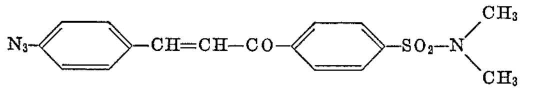

14. A reprographic material according to claim 1 in which the compound has the formula

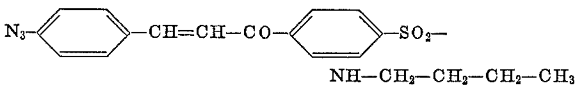

15. A reprographic material according to claim 1 in which the compound has the formula

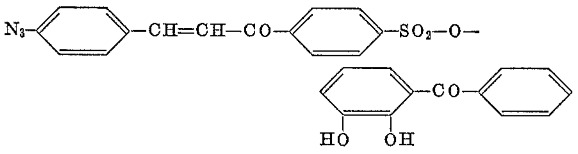

16. A photographic reproduction process which comprises exposing a supported light-sensitive layer to light under a master and developing the resulting image, the layer containing at least one water-insoluble photosensitive azidochalcone compound of the general formula

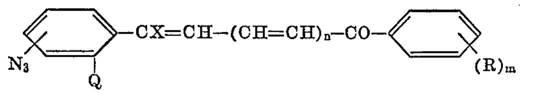

in which Q is selected from the group consisting of hydrogen or a substituent group, each R is a substituent group, X is selected from the group consisting of hydrogen and halogen, $m=1$ or 2, $n=0$ or 1, the azido group being in the 3- or 4-position of the benzene ring relative to the unsaturated chain, and one substituent group R may be linked with another substituent group R of the same benzene ring or of the corresponding benzene ring of a second structure of the same kind.

17. A photographic reproduction process according to claim 16 in which, in the layer, the compound is homogeneously distributed in a resin that is insoluble in water, soluble in organic solvents, and dissolves or swells in an alkaline aqueous solution.

18. A photographic reproduction process according to claim 17 in which the layer includes at least one additional resin which does not dissolve or swell in an aqueous alkaline solution, the additional resin being present in a proportion by weight which does not exceed the proportion of the soluble or swellable resin.

19. A photographic reproduction process according to claim 18 in which the layer includes a plasticizer, the additional resin and plasticizer being present in a total proportion by weight which does not exceed the proportion of the soluble or swellable resin.

20. A photographic reproduction process according to claim 18 in which the proportion of the compound to total resin is in the range of about 1:1 to 1:5 by weight.

21. A photographic reproduction process according to claim 19 in which the proportion of the compound to total resin plus plasticizer is in the range of about 1:1 to 1:5 by weight.

22. A photographic reproduction process according to claim 16 in which the compound is admixed with at least one other negatively working photosensitive substance.

23. A photographic reproduction process according to claim 16 in which the layer contains a dyestuff having little tendency to discoloration by etching liquids.

24. A photographic reproduction process according to claim 16 in which the compound has the formula

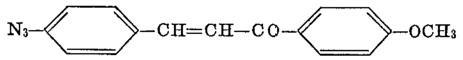

25. A photographic reproduction process according to claim 16 in which the compound has the formula

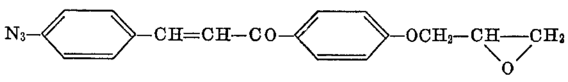

26. A photographic reproduction process according to claim 16 in which the compound has the formula

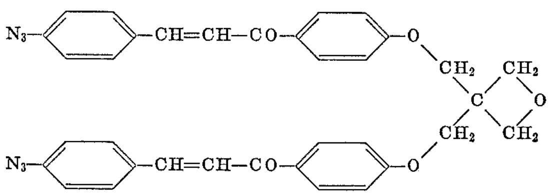

27. A photographic reproduction process according to claim 16 in which the compound has the formula

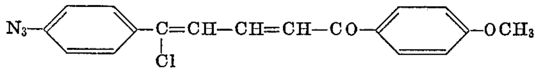

28. A photographic reproduction process according to claim 16 in which the compound has the formula

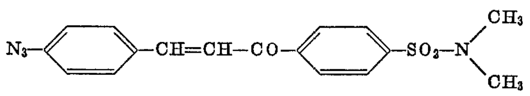

29. A photographic reproduction process according to claim 16 in which the compound has the formula

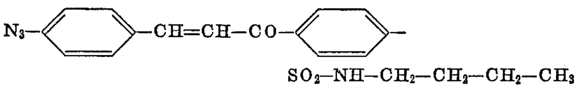

30. A photographic reproduction process according to claim 16 in which the compound has the formula

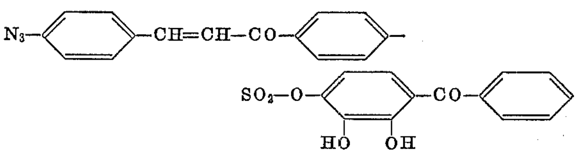

31. A photographic reproduction process according to claim 16 in which the exposed material is baked before development.

References Cited

UNITED STATES PATENTS

| | | | |
|---|---|---|---|
| 2,940,853 | 6/1960 | Sagura et al. | 96—75 |
| 2,870,011 | 1/1959 | Robertson et al. | 96—91N |
| 2,948,610 | 8/1960 | Merrill et al. | 96—91N |
| 2,848,328 | 8/1958 | Hepher | 96—75 |

NORMAN G. TORCHIN, Primary Examiner

E. C. KIMLIN, Assistant Examiner

U.S. Cl. X.R.

96—91, 75